US011803472B2

(12) United States Patent
Bhat et al.

(10) Patent No.: US 11,803,472 B2
(45) Date of Patent: Oct. 31, 2023

(54) INTEGRATED CIRCUITS (IC) EMPLOYING SUBSYSTEM SHARED CACHE MEMORY FOR FACILITATING EXTENSION OF LOW-POWER ISLAND (LPI) MEMORY AND RELATED METHODS

(71) Applicant: QUALCOMM Incorporated, San Diego, CA (US)

(72) Inventors: Girish Bhat, San Diego, CA (US); Subbarao Palacharla, San Diego, CA (US); Jeffrey Shabel, San Diego, CA (US); Isaac Berk, San Diego, CA (US); Kedar Bhole, San Diego, CA (US); Vipul Gandhi, San Diego, CA (US); George Patsilaras, San Diego, CA (US); Sparsh Singhai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/390,274

(22) Filed: Jul. 30, 2021

(65) Prior Publication Data

US 2023/0029696 A1 Feb. 2, 2023

(51) Int. Cl.
*G06F 12/084* (2016.01)
*G06F 1/3212* (2019.01)

(52) U.S. Cl.
CPC .......... *G06F 12/084* (2013.01); *G06F 1/3212* (2013.01); *G06F 2212/62* (2013.01)

(58) Field of Classification Search
CPC .. G06F 1/3212; G06F 12/084; G06F 2212/62; G06F 1/3275; G06F 12/0292; G06F 12/0842; G06F 12/0846; G06F 12/0864; G06F 2212/1028; G06F 2212/502; G06F 3/0625; G06F 3/0634
(Continued)

(56) References Cited

U.S. PATENT DOCUMENTS 9,335,809 B2 * 5/2016 Younger ............... G06F 1/3206
2014/0297959 A1 10/2014 Shiu et al.
(Continued)

OTHER PUBLICATIONS

International Search Report and Written Opinion for International Patent Application No. PCT/US2022/073007, dated Oct. 5, 2022, 14 pages.

*Primary Examiner* — Hashem Farrokh
(74) *Attorney, Agent, or Firm* — W&T/Qualcomm

(57) ABSTRACT

Integrated circuits (ICs) employ subsystem shared cache memory for facilitating extension of low-power island (LPI) memory. An LPI subsystem and primary subsystems access a memory subsystem on a first access interface in a first power mode and the LPI subsystem accesses the memory subsystem by a second access interface in the low power mode. In the first power mode, the primary subsystems and the LPI subsystem may send a subsystem memory access request including a virtual memory address to a subsystem memory interface of the memory subsystem to access either data stored in an external memory or a version of the data stored in a shared memory circuit. In the low-power mode, the LPI subsystem sends an LPI memory access request including a direct memory address to an LPI memory interface of the memory subsystem to access the shared memory circuit to extend the LPI memory.

23 Claims, 7 Drawing Sheets

(58) Field of Classification Search
USPC .................................................. 711/130, 13
See application file for complete search history.

(56) References Cited

U.S. PATENT DOCUMENTS

| | | |
|---|---|---|
| 2016/0019936 A1 | 1/2016 | Partiwala et al. |
| 2017/0090539 A1 | 3/2017 | Tiwari et al. |
| 2019/0129493 A1* | 5/2019 | Li .................. G06F 15/7817 |
| 2020/0103956 A1 | 4/2020 | Srinivas et al. |
| 2021/0064113 A1* | 3/2021 | Laurent ................... G11C 8/12 |

* cited by examiner

INTEGRATED CIRCUITS (IC) EMPLOYING SUBSYSTEM SHARED CACHE MEMORY FOR FACILITATING EXTENSION OF LOW-POWER ISLAND (LPI) MEMORY AND RELATED METHODS

BACKGROUND

I. Field of the Disclosure

The field of the disclosure relates generally to integrated circuits (ICs) that include multiple subsystems that function during normal operation of an IC and a low-power island (LPI) subsystem that also operates in a low-power mode.

II. Background

An integrated circuit (IC) that includes multiple subsystems for instruction and data processing, including peripheral and communication interfaces, may be referred to as a system on a chip (SoC). An SoC may be used in place of multiple chips in an electronic device to perform multiple functions and user applications. Subsystems in an SoC may execute applications or a thread of an application that requires instructions and data or may otherwise read and write stored information. The SoC may be coupled to an external memory. A memory subsystem manages storage of the data and instructions within the external memory and in the SoC. In this regard, the SoC also includes cache memories in which copies or versions of instructions and data are stored to reduce access latency or compared to accessing the external memory. Each of the subsystems may have their own dedicated caches and the memory subsystem may also access a cache memory that is shared among the subsystems. The shared cache memory functions as a higher level of cache than the dedicated caches in each subsystem. In some cases, a shared cache may be the highest-level cache in the SoC, referred to as the last level cache of the memory subsystem.

When the subsystems of an electronic device are inactive, the SoC may enter a low-power mode. In a low power mode, the supply voltage to the subsystems may be decoupled or shut-off to conserve power, for example. Some circuits must remain active to perform functions that are expected to continue, and to detect stimuli that can awaken the electronic device to return from low-power mode to normal operation. The circuits that remain active in low-power mode may be coupled to a secondary power source and such circuits may be referred to as a low-power island (LPI) subsystem with all the other circuits (e.g., all around the LPI) powered off. The LPI subsystem may include a processing circuit that executes instructions and generates data, which requires access to a memory. The amount of memory available to the LPI subsystem for storing instructions and data influences a level of capability of the LPI subsystem but increasing the amount of memory in an SoC to be used in the LPI subsystem increases area and cost of the IC. Thus, the amount of memory in an LPI subsystem may be limited, which limits functionality of the SoC in the low power mode.

SUMMARY OF THE DISCLOSURE

Aspects disclosed herein include integrated circuits (ICs) employing subsystem shared cache memory for facilitating extension of low-power island (LPI) memory. Related methods are also disclosed. An IC includes a plurality of primary subsystems that operate in a first power mode, and an LPI subsystem that operates in the first power mode and a second power mode (e.g., low-power mode). The LPI subsystem and the primary subsystems access a shared memory circuit in a memory subsystem by a subsystem memory interface in the first power mode. The primary subsystems and the LPI subsystem may send a subsystem memory access request to the memory subsystem on the subsystem memory interface to access instructions and data that may be stored in an external memory and may be cached in the shared memory circuit. The subsystem memory interface includes a tag random-access memory (RAM) to identify cache lines in the shared memory circuit dynamically allocated to memory addresses in the subsystem memory access requests.

The LPI subsystem accesses instructions and data in a first LPI memory image in the first power mode. The first LPI memory image is a region of memory including the instructions and data of all the processes executed by the LPI subsystem in the first power mode. The LPI subsystem accesses a second LPI memory image in the second power mode. The second LPI memory image is a subset of the first LPI memory image because the LPI subsystem executes fewer processes in the second power mode. Thus, a smaller memory is required for the second LPI memory image in the second power mode. In exemplary aspects, memory addresses in the second LPI memory image are directly mapped to cache lines in the shared memory circuit, which may store the entire second LPI memory image in the second power mode. Direct mapping these addresses eliminates the need for the tag RAM and associated hardware to be operating in the second power mode. The LPI subsystem may access the cache lines in the shared memory circuit in the second power mode by sending an LPI memory access request to an LPI memory interface. Since the second LPI memory image is a subset of the first LPI memory image, the second LPI memory image is also accessible to the LPI subsystem in the first power mode. The subsystem memory interface also directly maps memory addresses in the second LPI memory image to the associated cache lines in the shared memory circuit in the first power mode. In this regard, the addresses of instructions and data in the second LPI memory image need to remain constant in the first power mode and the second power mode. Therefore, the second LPI memory image is stored in a static memory address range in the external memory, which means that the instructions and data of the second LPI memory image are fixed and will not be relocated by the memory controller.

In exemplary aspects disclosed herein, an IC configured to operate in one of a first power mode and a second power mode is disclosed. The IC comprises an LPI subsystem circuit and a memory subsystem. The memory subsystem comprises a shared memory circuit and a subsystem memory interface configured to, in response to the IC operating in the first power mode, receive a first subsystem memory access request from the LPI subsystem circuit, and access the shared memory circuit in response to the first subsystem memory access request. The memory subsystem further comprises an LPI memory interface configured to, in response to the IC operating in the second power mode, receive an LPI memory access request from the LPI subsystem circuit, and access the shared memory circuit in response to the LPI memory access request.

In another exemplary aspect, a method operating an IC in one of a first power mode and a second power mode is disclosed. The method includes, in response to the IC operating in the first power mode, receiving, in a subsystem memory interface in a memory subsystem, a first subsystem memory access request from an LPI subsystem circuit, and accessing, by the subsystem memory interface, a shared memory circuit in response to the first subsystem memory access request. The method further comprises, in response to the IC operating in the second power mode, receiving, in an LPI memory interface in the memory subsystem, an LPI memory access request from the LPI memory interface, and accessing, by the LPI memory interface, the shared memory circuit in response to the LPI memory access request.

DETAILED DESCRIPTION

Figure 1:
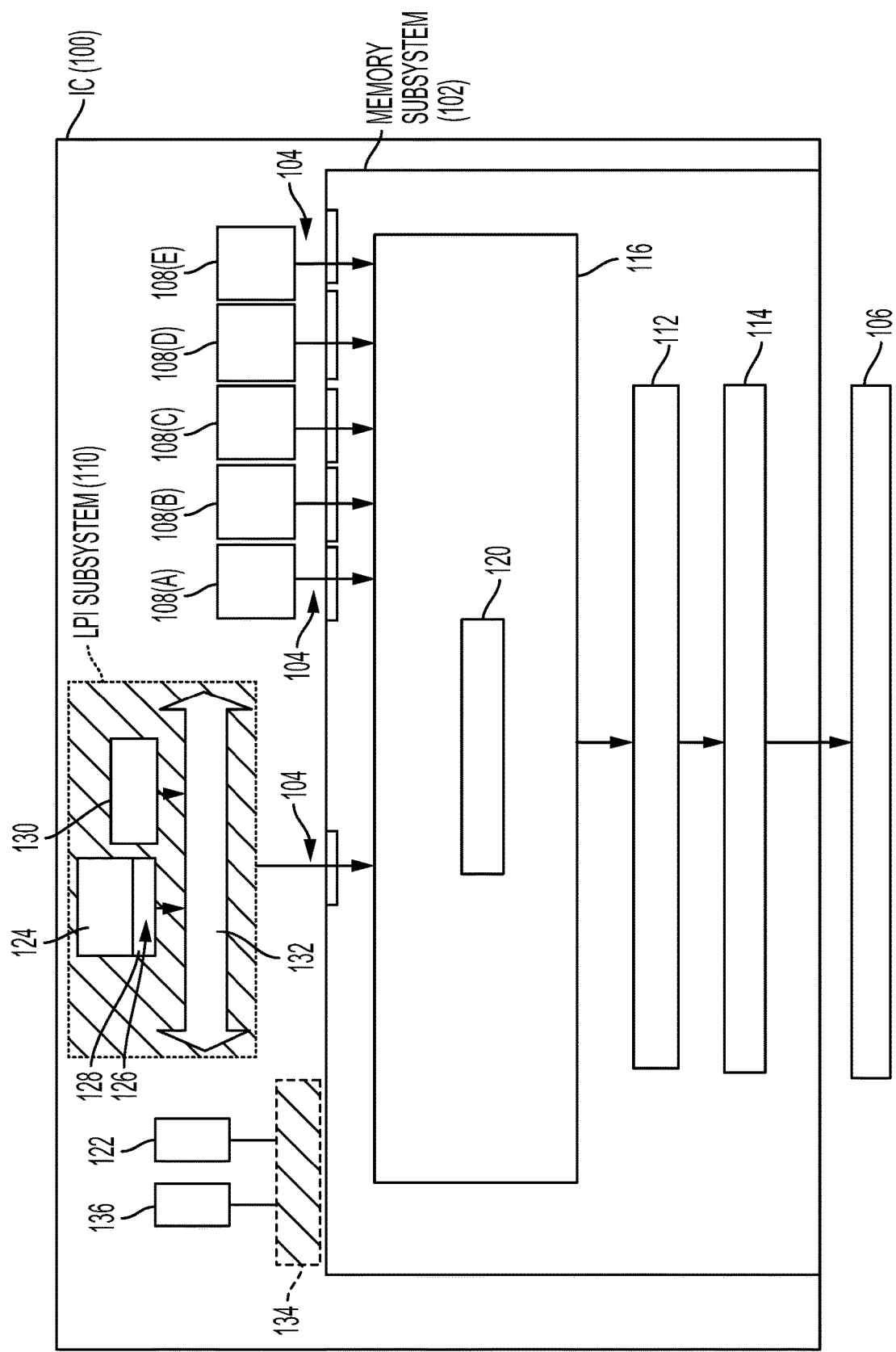
FIG. 1 is block diagram of a conventional integrated circuit (IC) including a memory subsystem that receives memory access requests for data stored in an external memory from a plurality of subsystems and a low-power island (LPI) subsystem in a first power mode, and is powered off in a second power mode.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include integrated circuits (ICs) employing subsystem shared cache memory for facilitating extension of low-power island (LPI) memory. Related methods are also disclosed. An IC includes a plurality of primary subsystems that operate in a first power mode, and an LPI subsystem that operates in the first power mode and a second power mode (e.g., low-power mode). The LPI subsystem and the primary subsystems access a shared memory circuit in a memory subsystem by a subsystem memory interface in the first power mode. The primary subsystems and the LPI subsystem may send a subsystem memory access request to the memory subsystem on the subsystem memory interface to access instructions and data that may be stored in an external memory and may be cached in the shared memory circuit. The subsystem memory interface includes a tag random-access memory (RAM) to identify cache lines in the shared memory circuit dynamically allocated to memory addresses in the subsystem memory access requests.

The LPI subsystem accesses instructions and data in a first LPI memory image in the first power mode. The first LPI memory image is a region of memory including the instructions and data of all the processes executed by the LPI subsystem in the first power mode. The LPI subsystem accesses a second LPI memory image in the second power mode. The second LPI memory image is a subset of the first LPI memory image because the LPI subsystem executes fewer processes in the second power mode. Thus, a smaller memory is required for the second LPI memory image in the second power mode. In exemplary aspects, memory addresses in the second LPI memory image are directly mapped to cache lines in the shared memory circuit, which may store the entire second LPI memory image in the second power mode. Direct mapping these addresses eliminates the need for the tag RAM and associated hardware to be operating in the second power mode. The LPI subsystem may access the cache lines in the shared memory circuit in the second power mode by sending an LPI memory access request to an LPI memory interface. Since the second LPI memory image is a subset of the first LPI memory image, the second LPI memory image is also accessible to the LPI subsystem in the first power mode. The subsystem memory interface also directly maps memory addresses in the second LPI memory image to the associated cache lines in the shared memory circuit in the first power mode. In this regard, the addresses of instructions and data in the second LPI memory image need to remain constant in the first power mode and the second power mode. Therefore, the second LPI memory image is stored in a static memory address range in the external memory, which means that the instructions and data of the second LPI memory image are fixed and will not be relocated by the memory controller.

ICs that include all or many of the components of a system are known as systems on a chip (SoCs). SoCs are used in hand-held and mobile electronic devices to reduce the number of devices required in a package, to reduce the package size. Although the sizes of transistors within an IC may get smaller with each generation, the number of transistors in an IC tends to increase. In addition, the sizes of software images, comprising instructions and data for SoC subsystems, also continue to increase to provide improved function and performance. Thus, the capacities of caches used by processors and processing circuits in SoCs continue to increase. As the cache sizes in SoCs increase, so does a rate of power consumption in the SoC. Power consumption affects battery life and generates heat. A technique used for reducing power consumption is to implement a low-power mode that may be triggered in a device when there has been no activity in the primary subsystems of the SoC for a threshold period of time. A low-power mode reduces power consumption in areas of an IC that are not essential until the system is awoken from the low-power mode.

FIG. 1 is a block diagram of a conventional IC 100 including a memory subsystem 102 that receives subsystem memory access requests 104 to access data in an external memory 106 which may be coupled to the IC 100. The subsystem memory access requests 104 are received from a plurality of primary subsystems 108(A)-108(E) and from an LPI subsystem 110. In this context, subsystem memory access requests include read operations and write operations that result in a transfer of "data" between the memory subsystem 102 and one of the primary subsystems 108(A)-108(E) or the LPI subsystem 110 ("the subsystems 108(A)-108(E) and 110"). In this context, "data" includes instructions, application data, user data, and any other information that may be stored in the external memory by or for the primary subsystems 108(A)-108(E) and the LPI subsystem 110 of the IC 100. The memory subsystem 102 also includes a memory circuit 112, which may include, for example, a plurality of memory banks (not shown). The memory circuit 112 is a last (i.e., highest) level cache in the memory subsystem 102 for storing data on the IC 100 to reduce data access (i.e., reading or writing) time for the subsystems 108(A)-108(E) and 110.

Examples of the primary subsystems 108(A)-108(E) may include a central processing unit (CPU), a graphics processing unit (GPU), multi-media, peripheral interfaces and devices, a modem, etc. The primary subsystems 108(A)-108(E) may execute applications based on instructions stored in the external memory 106. The subsystem memory access requests 104 from the primary subsystems 108(A)-108(E) and the LPI subsystem 110 include memory addresses of data stored in the external memory 106. In the memory subsystem 102, the subsystem memory access requests 104 are received in a subsystem memory interface 116 that is coupled to each of the primary subsystems 108(A)-108(E) and to the LPI subsystem 110. The subsystem memory interface 116 accesses the memory circuit 112 in response to the subsystem memory access requests 104. If the data being accessed by the subsystem memory access requests 104 is not found in the memory circuit, a memory controller 114 accesses the data in the external memory 106. The subsystem memory interface 116 includes a tag RAM 120 that dynamically allocates cache lines in the memory circuit 112 to store versions of data from memory addresses in the external memory 106. The tag RAM may be accessed in response to every subsystem memory access request 104 received in the memory subsystem 102.

As noted, the LPI subsystem 110 is also coupled to the subsystem memory interface 116. The LPI subsystem 110 supports "always-on" features that are expected to function even when the primary subsystems 108(A)-108(E) are inactive in a low-power mode. Always-on functions supported by the LPI subsystem 110 include clocks, timers, sensors, and audio receivers, for example. Under normal operating conditions, in which all of the primary subsystems 108(A)-108(E) and the memory subsystem 102 are coupled to a supply voltage source 122, the LPI subsystem 110 also accesses data in the external memory 106 by sending memory access requests to the subsystem memory interface 116. The LPI subsystem 110 includes a processor 124 and other hardware that provide the always-on features. The processor 124 may execute instructions 126 in a first LPI memory image stored in the external memory 106. The instructions 126 may also be copied into an LPI cache 128, outside of the processor 124 for fast access. The processor 124 may include an internal level one (L1) cache (not shown) and the LPI cache 128 may be a level two (L2) cache (not shown). Instructions and other data of the first LPI memory image may be stored in a tightly-coupled memory (TCM) 130 in the LPI subsystem 110 that is accessible to the processor 124 on an LPI interconnect bus 132 during the low-power mode. Versions of data for the LPI subsystem 110 may also be stored in the memory circuit 112 in the memory subsystem 102 in the first power mode. It should be understood that a "version" of data, such as user data or an instruction, in this context may be an identical copy of data stored in the external memory 106 or may be modified since being read from the external memory 106. An access time to the memory circuit 112 may be greater than access time to the LPI cache 128 or the TCM 130, but the memory circuit 112 may have greater capacity than the LPI cache 128 and the TCM 130 and have a shorter access time than the external memory 106.

In contrast to the normal operating conditions, the IC 100 may be put in a "low-power mode" either by the user or by an SoC power manager 134, for example, after detecting that all the primary subsystems 108(A)-108(E) have been inactive for a period of time. In the low-power mode, the supply voltage source 122 may decouple from the primary subsystems 108(A)-108(E) and the memory subsystem 102, while the LPI subsystem 110 may remain coupled to an LPI voltage source 136. The LPI voltage source 136 may provide the same voltage as the supply voltage source 122 or a different voltage that reduces power consumption in the LPI subsystem 110. With the supply voltage source 122 decoupled from the subsystem memory interface 116, the LPI subsystem 110 is isolated from the rest of the IC 100 and from the external memory 106. Thus, in the low-power mode, the processor 124 is limited to a second LPI memory image, which is a subset of the first LPI memory image and includes only instructions and other data that may be used in the low-power mode. Thus, the LPI subsystem 110 has reduced function that may be due to a reduced memory capacity in the low-power mode.

Figure 2:
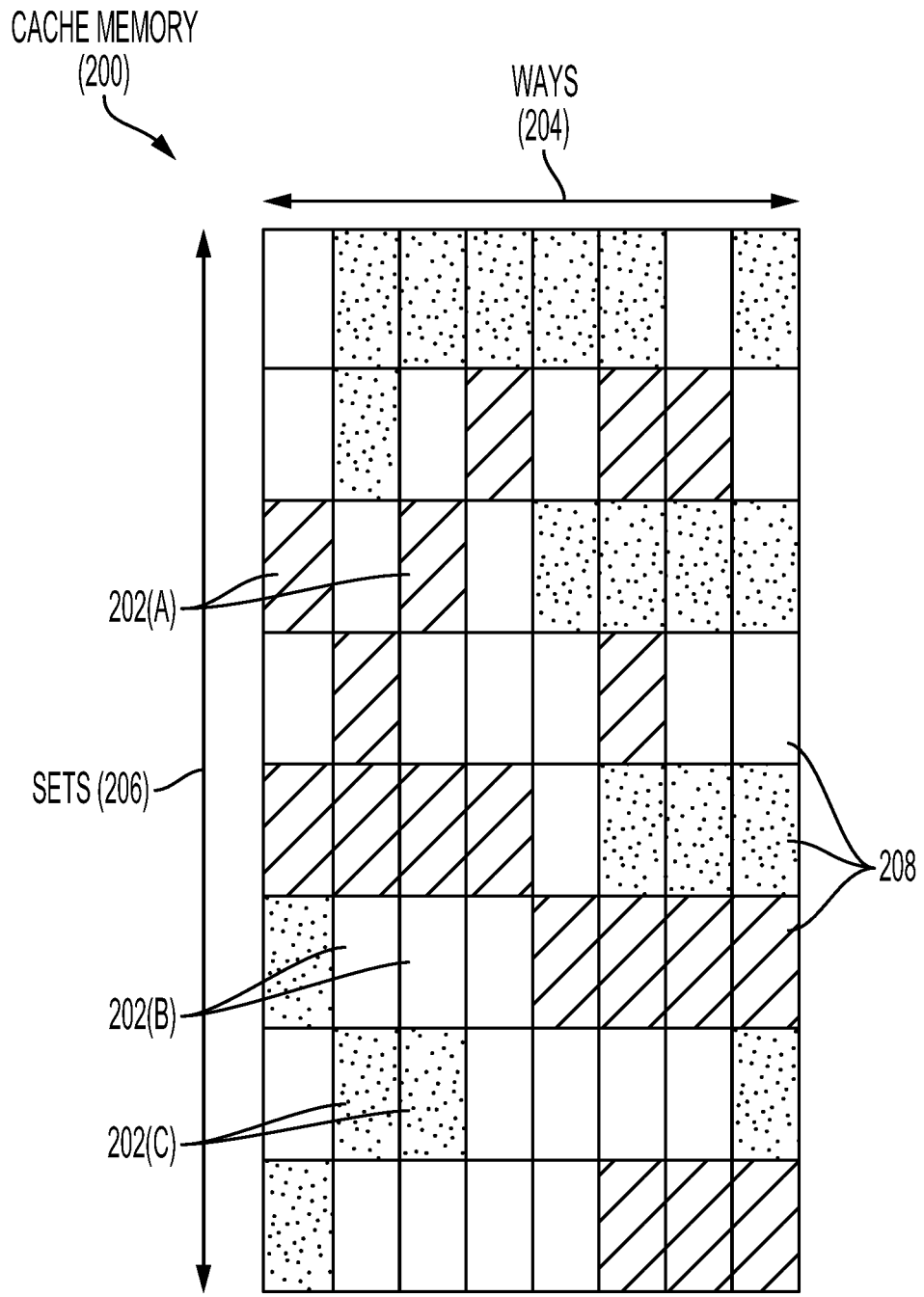
FIG. 2 is an illustration of a cache memory circuit in an IC, the cache memory circuit is partitioned into cache lines allocated to one or more subsystems and accessed by a tag random-access memory (RAM) in the first power mode.

FIG. 2 is an illustration of a cache memory 200, corresponding to the memory circuit 112 in FIG. 1, which has been partitioned into sub-caches 202(A)-202(C) for use in the normal operating mode. Each of the sub-caches 202(A)-202(C) may be dedicated to one or more of the primary subsystems 108(A)-108(E) and the LPI subsystem 110, and the sub-caches 202(A)-202(C) may be identified by a sub-cache identifier (SCID), for example. An SCID may be included in a subsystem memory access request. The cache memory 200 may be an N-way set associative cache with N=eight (8) ways 204 and eight (8) sets 206 as shown in the example in FIG. 2. The sub-caches 202(A)-202(C) may be arranged in cache lines 208 according to the ways 204 and/or the sets 206. Alternatively, each of the sub-caches 202(A)-202(C) may be limited to a maximum number of the cache lines 208 based on a priority, without predetermined locations, as shown in FIG. 2, as an example. In the context of the IC 100 in FIG. 1, the cache memory 200 may be accessed under the control of the subsystem memory interface 116. The tag RAM 120 in FIG. 1 may be used to allocate and track the cache lines 208 in the cache memory 200 for each of the sub-caches 202(A)-202(C) based on the SCID. In some examples, the SCID may be a portion of a memory address provided in a subsystem memory access request 104.

Figure 3:
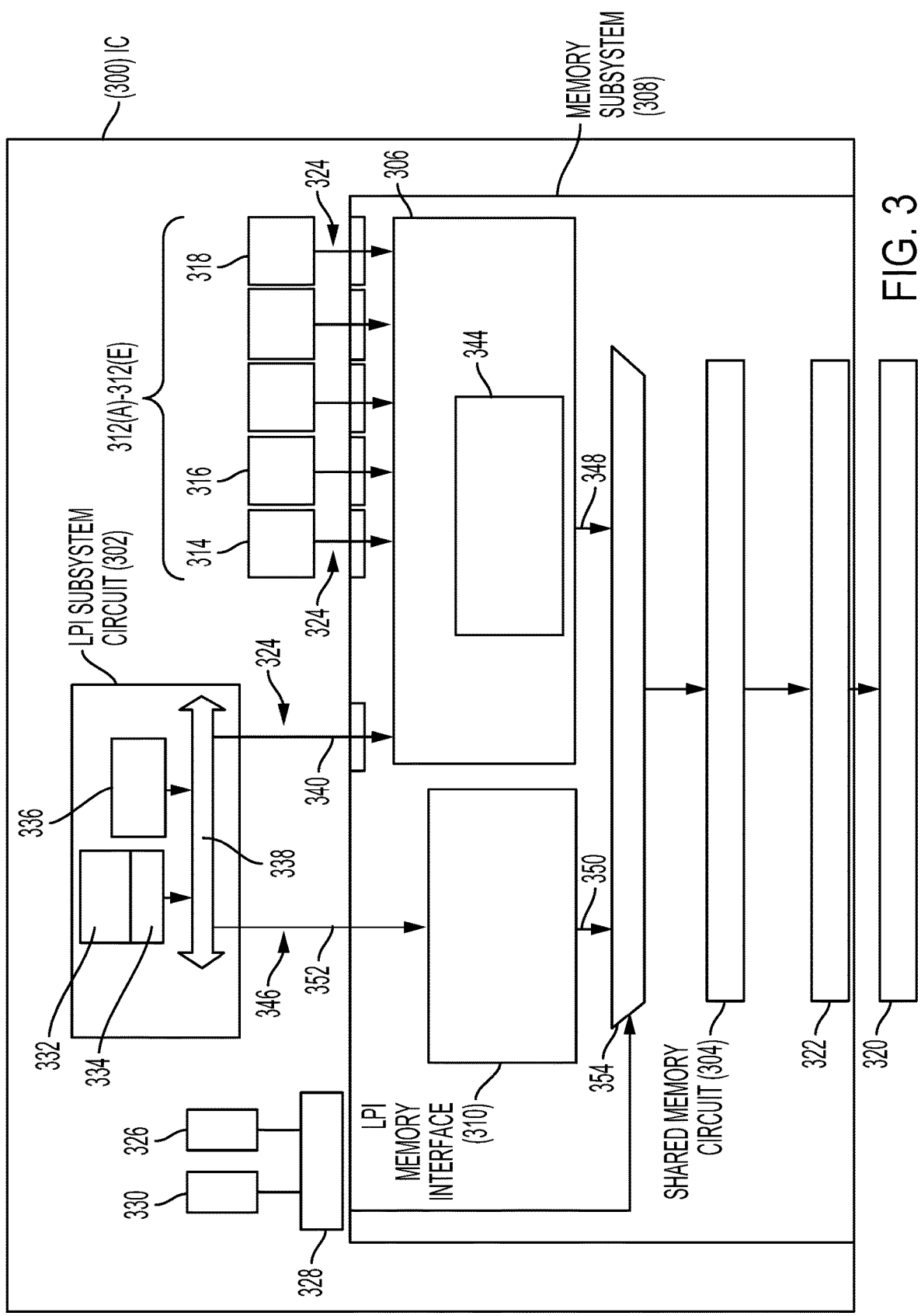
FIG. 3 is an exemplary IC including an LPI subsystem configured to access a shared memory circuit by a subsystem memory interface in a memory subsystem in a first power mode and access the shared memory circuit by an LPI memory interface in the second power mode.

FIG. 3 is a block diagram of an exemplary IC 300 including an LPI subsystem circuit 302 configured to access a shared memory circuit 304 on a subsystem memory interface 306 of a memory subsystem 308 in a first power mode and access the shared memory circuit 304 on a LPI memory interface 310 of the memory subsystem 308 in a second power mode. The different avenues for the LPI subsystem circuit 302 to access the shared memory circuit 304 are explained in the context of the following detailed description of the IC 300.

The IC 300 includes a plurality of primary subsystem circuits 312(A)-312(E), which are referred to as "primary" herein because they support functions and applications of the IC 300 in a normal operating mode. For example, the primary subsystems 312(A)-312(E) may include a CPU 314 configured to execute one or more threads of instructions for applications performed in an electronic device (not shown). The primary subsystems 312(A)-312(E) may include a GPU 316 configured to perform graphics processing for video features of user applications, for example. Other examples of the primary subsystems 312(A)-312(E) may include peripheral subsystems 318 including interfaces and devices, such as gaming, audio, video, and input/output features or a modem.

Each of the primary subsystems 312(A)-312(E) may execute software instructions that process various forms of data including application data, data bases, and user data. As noted above, the instructions may also be referred to herein as data for brevity. The data of the primary subsystems 312(A)-312(E) may be stored in an external memory 320 that is coupled to the IC 300 through a memory controller 322, in this example. The primary subsystems 312(A)-312(E) access the external memory 320 by sending subsystem memory access requests 324 to the subsystem memory interface 306. The subsystem memory interface 306 is configured to receive a subsystem memory access request 324 from the primary subsystems 312(A)-312(E) in the first power mode. The instructions executed in the respective primary subsystems 312(A)-312(E) may each access a range of memory in the external memory 320. Thus, the subsystem memory access requests 324 include memory addresses of instructions and other data that are read from and/or written to the external memory 320. The memory controller 322 accesses the external memory 320 based on the memory addresses in the subsystem memory access requests 324.

A request to access the external memory 320 by one of the primary subsystems 312(A)-312(E) may incur a long delay or latency between sending a subsystem memory access request 324 and receiving a response, which may result in idle processing cycles in the CPU 314 or GPU 316, for example, which can cause noticeable delays and poor performance in user applications. Since many instructions and data are frequently reused by a processing device, the primary subsystems 312(A)-312(E) may each include their own internal cache memories (not shown) in which a version of data read from the external memory 320 may be kept locally for quick access. In some examples, the primary subsystems 312(A)-312(E) may include multiple levels of caches (e.g., L1, L2, L3, etc.). In addition, the memory subsystem 308 also includes the shared memory circuit 304, providing another level of cache storage. The subsystem memory interface 306 may access the shared memory circuit 304 in response to the subsystem memory access request 324. The shared memory circuit 304 may be a last level cache (LLC) or highest level of cache in the IC 300. The shared memory circuit 304 may be partitioned for use by multiple subsystems as shown in the cache memory 200 in FIG. 2.

The LPI subsystem circuit 302 may provide functions such as receiving voice commands, sensing light levels, detecting motion and responding to other forms of stimuli. These functions are expected to be operational in parallel with the primary subsystems 312(A)-312(E). Thus, the subsystem memory interface 306 is also configured to receive a subsystem memory access request 324 from the LPI subsystem circuit 302 in the first power mode.

The primary subsystems 312(A)-312(E) are coupled to a first supply voltage source 326 in the first power mode. In mobile devices and other battery-powered devices, conserving power can extend battery life. In this regard, a period of inactivity in the primary subsystems 312(A)-312(E) may be detected by an IC power manager circuit 328, or in some other manner. Therefore, after a period of inactivity, the IC 300 may enter the second power mode (e.g., low power mode) in which the primary subsystems 312(A)-312(E) may be decoupled from the first supply voltage source 326 to reduce power consumption. The IC 300 may also be put into the second power mode by a user of an electronic device comprising the IC 300. However, the LPI subsystem circuit 302 is expected to continue to function even when the primary subsystems 312(A)-312(E) are inactive. The LPI subsystem circuit 302 is coupled to the first supply voltage source 326 in the first power mode. The LPI subsystem circuit 302 may be decoupled from the first supply voltage source 326 and coupled to a second supply voltage source 330 in the second power mode. The primary subsystems 312(A)-312(E) are not coupled to the second supply voltage source in the second power mode. The second power mode is also known as a low-power mode because a rate of power consumption in the second power mode may be significantly reduced by decoupling inactive circuits from both of the supply voltage sources 326 and 330. As described further below, a first set of circuits of the IC 300 are powered and functional in response to the IC 300 operating in the first power mode and a second set of circuits are powered and functional in response to the IC 300 operating in the second power mode. Operational differences of the LPI subsystem circuit 302 may be described below with reference to the phrases "in a first power mode" and "in a second power mode", for example.

The second supply voltage source 330 may provide a voltage that is the same or different (e.g., lower) than a voltage provided by the first supply voltage source. The second supply voltage source 330 may be configured to couple to different circuits than the first supply voltage source 326. In an alternative example, rather than decoupling the LPI subsystem circuit 302 from the first supply voltage source 326 and coupling to the second supply voltage source 330, the LPI subsystem 302 may continue to be coupled to the first supply voltage source 326 while the primary subsystems 312(A)-312(E) are decoupled from the first supply voltage source 326 in the second power mode.

Although decoupling the primary subsystems 312(A)-312(E) from the first supply voltage source 326 significantly reduces power consumption, additional steps may be taken to further conserve power in the second power mode, including shutting down access to the external memory 320. The external memory 320 may be, for example, a dynamic RAM (DRAM), which may be a double data rate (DDR) RAM. To conserve power, the DRAM may be put in a self-refresh mode in which low power circuits are used to refresh the memory cells as needed to maintain the stored data. These circuits may be outside the IC 300. Since the primary subsystems 312(A)-312(E) are inactive and the external memory 320 is in self-refresh mode, the subsystem memory interface 306 in the memory subsystem 308 is decoupled from the first supply voltage source 326 in the second power mode. The subsystem memory interface 306 is not coupled to the second supply voltage source 330 in the second power mode.

The LPI subsystem circuit 302 may include a processor 332 that executes a set of instructions that determine a level of functionality of the LPI subsystem circuit 302. In the first power mode, the LPI subsystem circuit 302 accesses a first LPI memory image that may have increased capabilities and performance due to having access to a larger memory space available in the external memory 320. The first LPI memory image includes instructions and data for providing the capabilities of the LPI subsystem in the first power mode. The LPI subsystem circuit 302 includes an LPI cache circuit 334, which may be a level two (L2) cache for low-latency temporary storage outside the processor 332. The LPI subsystem may also include a TCM 336 that is accessible from the processor 332 over an LPI interconnect bus 338. The TCM 336 may provide local storage within the LPI subsystem circuit 302. A first data of the LPI subsystem circuit 302 may be stored in the TCM 336 and a version of the first data may be stored in the LPI cache circuit 334 in either power mode.

In the first power mode, the LPI subsystem circuit 302 generates the subsystem memory access requests 324 on a first LPI interface 340 coupled to the subsystem memory interface 306. In the second power mode, the LPI subsystem circuit 302 operates without access to the external memory 320. Thus, the processor 332 has access to a second LPI memory image including a smaller set of instructions and data (i.e., smaller image) than the first LPI memory image. The second LPI memory image includes instructions and data for providing the capabilities of the LPI subsystem in the second power mode. The second LPI memory image may be a subset of the first LPI memory image. Thus, the second LPI memory image may also be accessed via subsystem memory access requests 324 to the subsystem memory interface 306 in the first power mode. A size of the second LPI memory image may be limited by the memory capacity of the TCM 336, in some examples. The size of the TCM 336 could be increased but, because the increase in TCM size would provide increased functionality that is used only in the second power mode (low power mode), an increase in the size of the IC 300 for this purpose may be unacceptable.

In an exemplary aspect, the LPI subsystem circuit 302 accesses the shared memory circuit 304 in the second power mode for increased memory capacity in which a larger second LPI memory image may be stored. Thus, the shared memory circuit 304 is coupled to the first supply voltage source 326 in the first power mode and also coupled to the second supply voltage source 330 in the second power mode. In this regard, the functionality of the LPI subsystem circuit 302 may be increased without increasing the size of the TCM 336, which would increase the area of the IC 300.

In another aspect, the subsystem memory interface 306 includes a tag RAM 344 to access the shared memory circuit 304 in response to subsystem memory access requests 324. In one example, access to the shared memory circuit 304 may cause data to be stored in a cache line 208 (as shown in FIG. 2) of the shared memory circuit 304. The tag RAM 344 may determine a cache line 208 that is unused, or a cache line 208 that may be evicted, and dynamically map the memory address of the data to be stored to the cache line 208. Alternatively, the tag RAM 344 may determine that a cache line 208 has been previously dynamically mapped to the memory address and write the data to be stored into the cache line 208. In another example, access to the shared memory circuit 304 may include reading data from a cache line 208. In this example, the tag RAM 344 may be accessed to dynamically map the memory address to be read to one of the cache lines 208 and read the contents of the cache line 208. In this context, the phrase "dynamic mapping" refers to determining which, of several possible cache lines, is the destination of a memory access instruction. For example, dynamic mapping may correspond to selecting among ways in a set of a cache that corresponds to a given memory address. Dynamic mapping differs from direct mapping at least because direct mapping refers to a one to one relationship between a memory address and a cache line in the shared memory circuit 304.

In contrast, the LPI memory interface 310 is configured to receive an LPI memory access request 346 from the LPI subsystem circuit 302 in the second power mode and access the shared memory circuit 304 in response to the LPI memory access request 346. Only one cache line 208 is directly mapped to a memory address. Thus, dynamic mapping is not performed in the LPI memory interface 310. The LPI memory interface 310 provides access to the shared memory circuit 304 in the second power mode without the tag RAM 344, which reduces power consumption compared to the combined circuits of the subsystem memory interface 306. The LPI memory interface 310 is coupled to the second supply voltage source 330 in the second power mode and decoupled from the second supply voltage source 330 in the first power mode. The LPI memory interface 310 is not coupled to the first supply voltage source 326.

Figure 4:
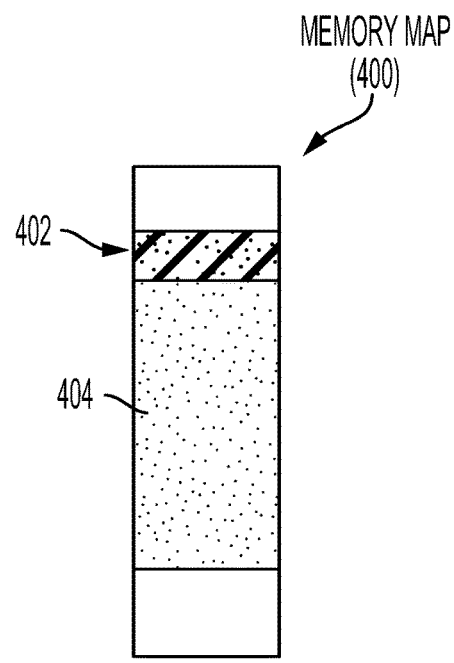
FIG. 4 is an illustration of a memory map of an external memory showing a low-power image statically mapped to a contiguous address range including instructions and data for the LPI subsystem in FIG. 3 in the low-power mode.

In another exemplary aspect, the second LPI memory image for the LPI subsystem circuit 302 is stored in a static (i.e., fixed) and contiguous memory address range in the external memory 320 (see FIG. 4). Memory addresses within the second LPI memory image are mapped directly to cache lines 208 (shown in FIG. 2) in the shared memory circuit 304. Memory addresses within the second LPI memory image may be directly addressed by the LPI subsystem circuit 302 in subsystem memory access requests 324 sent to the subsystem memory interface 306 over the first LPI interface 340 in the first power mode. Memory addresses within the second LPI memory image may also be directly addressed by the LPI subsystem circuit 302 in LPI memory access requests 346 sent to the LPI memory interface 310 in the second power mode. The subsystem memory interface 306 is configured to access the shared memory circuit 304 on a first memory interface 348 based on a memory address in the subsystem memory access request 324 in the first power mode. A memory address on the first memory interface 348 is a cache line address of a cache line 208 in the shared memory circuit 304 that is directly mapped to the memory address in the subsystem memory access request 324 to the second LPI memory image. Memory addresses outside the second LPI memory image are not directly mapped. In response to a memory address in the subsystem memory access request 324 that is outside the second LPI memory image, the tag RAM 344 identifies a cache line of the shared memory circuit 304 that may be dynamically allocated to the memory address and the cache line address of the cache line is provided on the first memory interface 348.

In contrast, the LPI memory interface 310 is configured to access the shared memory circuit 304 on a second memory interface 350 based on a direct memory address in the LPI memory access request 346. The LPI subsystem circuit 302 accesses the shared memory circuit 304 like a scratchpad memory. Prior to entering the low-power mode, instructions and data of the second LPI memory image may be read from the external memory 320 and stored in the shared memory circuit 304. Since the LPI memory interface 310 may be used in the second power mode to only access memory addresses in the second LPI memory image, cache line addresses for cache lines 208 directly mapped to the second LPI memory image are provided to the shared memory circuit 304 on the second memory interface 350. In this regard, the tag RAM 344 is not needed and the shared memory circuit 304 may be accessed with reduced power consumption. Access to the shared memory circuit 304 provides more memory space to the LPI subsystem circuit 302 in the second power mode than the storage capacity of the TCM 336 without increasing the size of the IC 300. In one example, the TCM 336 may be omitted because the entire second LPI memory image may be stored in the shared memory circuit 304.

In the second power mode, the LPI subsystem circuit 302 generates the LPI memory access request 346 on a second LPI interface 352 coupled to the LPI memory interface 310. The shared memory circuit 304 may be an extension of the memory space available in the TCM 336, if a TCM 336 is present. A version of the data stored in the shared memory circuit 304 may be stored in the LPI cache circuit 334 of LPI subsystem circuit 302 in the second power mode for faster access by the processor 332.

The subsystem memory interface 306 and the LPI memory interface 310 may not be directly coupled to the shared memory circuit 304. In the example in FIG. 3, the memory subsystem 308 also includes a switch circuit 354 that is configured to couple the subsystem memory interface 306 to the first memory interface 348 in the first power mode and couple the LPI memory interface 310 to the second memory interface 350 in the second power mode. The switch circuit 354 may be a multiplexor circuit that is coupled to the first supply voltage source 326 in the first power mode and coupled to the second supply voltage source 330 in the second power mode. The IC power manager circuit 328 may couple and uncouple the first supply voltage source 326 and the second supply voltage source 330 to respective circuits in the IC 300 in response to the first power mode and the second power mode.

FIG. 4 is an illustration of a memory map 400 of the external memory 320 in FIG. 3 showing a static and contiguous second LPI memory image 402 including instructions and other data for the LPI subsystem circuit 302 in the second power mode. The second LPI memory image 402 is in a memory address range that corresponds to the "scratchpad" memory provided for the LPI subsystem circuit 302 in the shared memory circuit 304 in FIG. 3. The range of memory addresses in the second LPI memory image 402 are directly mapped to cache lines 208 (see FIG. 2) in the shared memory circuit 304. In other aspects, the cache lines 208 mapped to the second LPI memory image may function as normal cache lines for storing versions (e.g., exact copies or updated versions) of data stored in the external memory 320. For example, there may be a dirty/modified indicator associated with each cache line 208 that may indicate whether contents of the cache line should be written to the external memory 320. Instructions and data of the first LPI memory image that are outside of the second LPI memory image 402 may be located in any usable portion 404 in the memory map 400. Similarly, instructions and data for the primary subsystems 312(A)-312(E) may be located in the usable portion 404 of the memory map 400 outside of the second LPI memory image.

Figure 5:
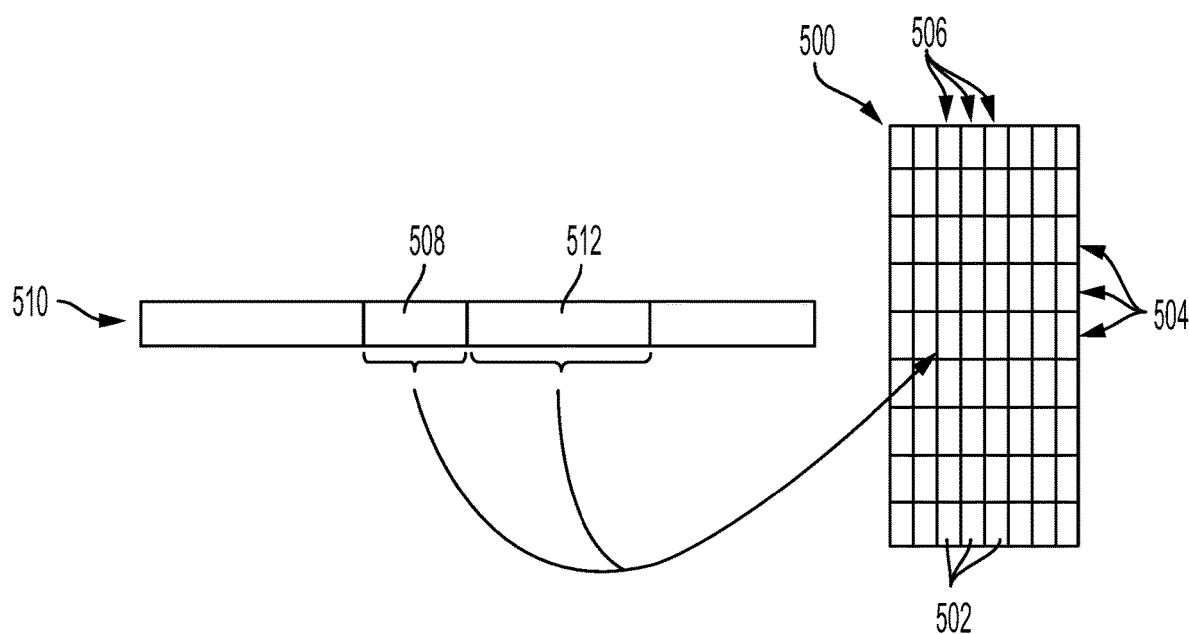
FIG. 5 is an illustration of a shared memory circuit including dynamically allocated cache lines and cache lines that are directly mapped to memory addresses in an LPI memory access request.

FIG. 5 is an illustration of a memory circuit 500 corresponding to the shared memory circuit 304 in FIG. 3. FIG. 5 illustrates a method for direct address mapping employed in the LPI memory access requests 346 to access cache lines 502 in the memory circuit 500, as used in the second power mode in the IC 300 in FIG. 3. Each cache line 502 may correspond to an addressable memory space. The memory circuit 500 may be organized in rows 504 and columns 506, as an example. The rows 504 and columns 506 may correspond to sets and ways, respectively, for example. A first address portion 508 of a direct memory address 510 may be decoded to identify a column 506, and a second address portion 512 of the direct memory address 510 may be decoded to identify a row 504. In this manner, a direct memory address 510 received in either the LPI memory access requests 346 or the subsystem memory access requests 324 discussed with regard to FIG. 3 can be decoded to identify a corresponding cache line 502. Thus, a cache control circuit including a tag RAM is not needed to access the memory circuit 500 in the low-power mode, which improves power conservation.

Figure 6:
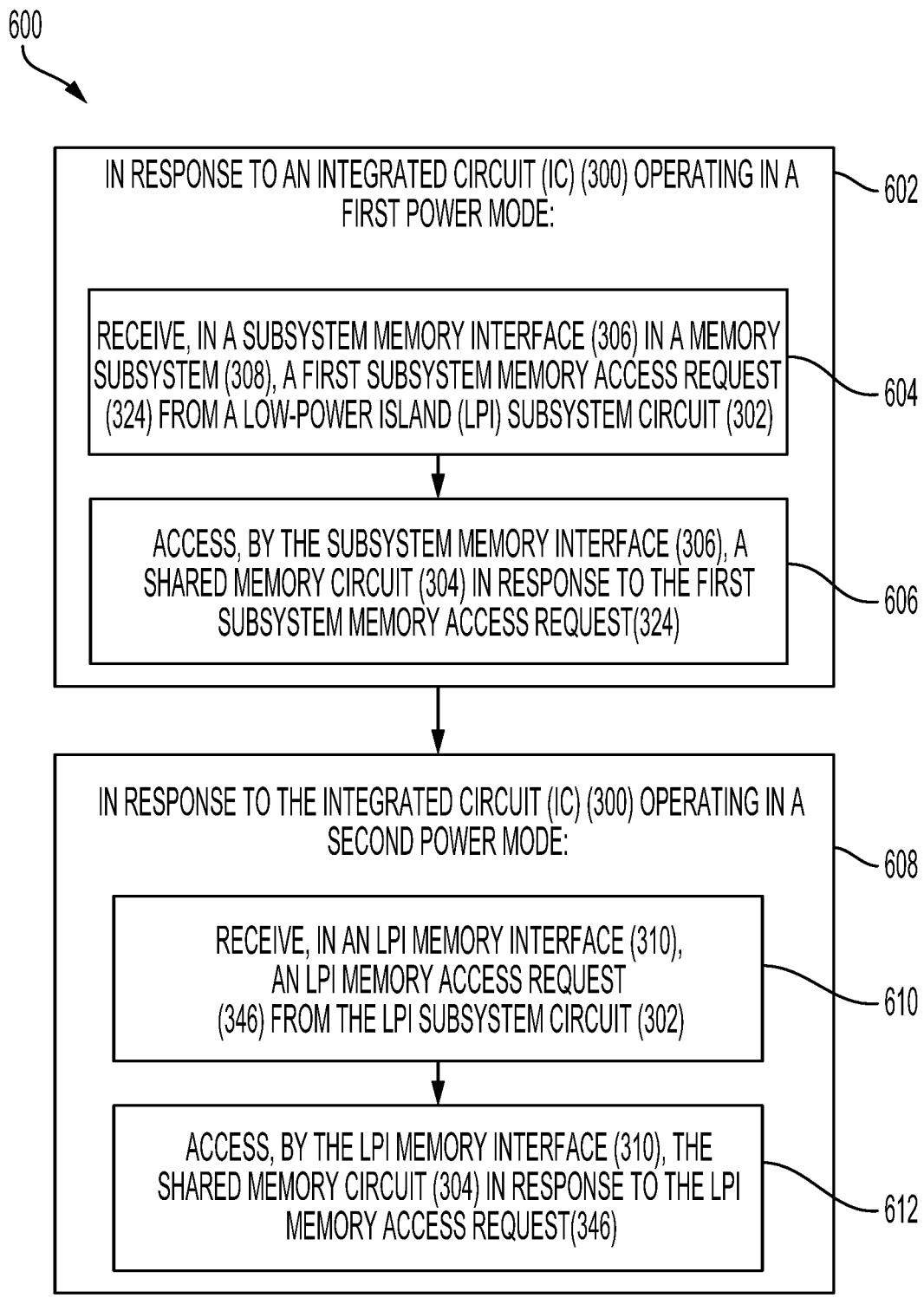
FIG. 6 a flowchart of a method in the IC in FIG. 3 including an LPI subsystem configured to access, on a subsystem memory interface to a memory subsystem, a shared memory circuit as a last level cache in a first power mode and access, on an LPI memory interface, the shared memory circuit as an LPI subsystem memory in the second power mode.

FIG. 6 is a flowchart of a method in the IC 300 in FIG. 3. The method 600 includes, in response to an IC 300 operating in a first power mode (block 602), receiving, in a subsystem memory interface 306 in a memory subsystem 308, a first subsystem memory access request 324 from an LPI subsystem circuit 302 (block 604). The method further includes accessing, by the subsystem memory interface 306, a shared memory circuit 304 in response to the first subsystem memory access request 324 (block 606). The method further includes, in response to the IC 300 operating in a second power mode (block 608), receiving, in an LPI memory interface 310, an LPI memory access request 346 from the LPI subsystem circuit 302 (block 610). The method includes accessing, by the LPI memory interface 310, the shared memory circuit 304 in response to the LPI memory access request 346 (block 612).

Figure 7:
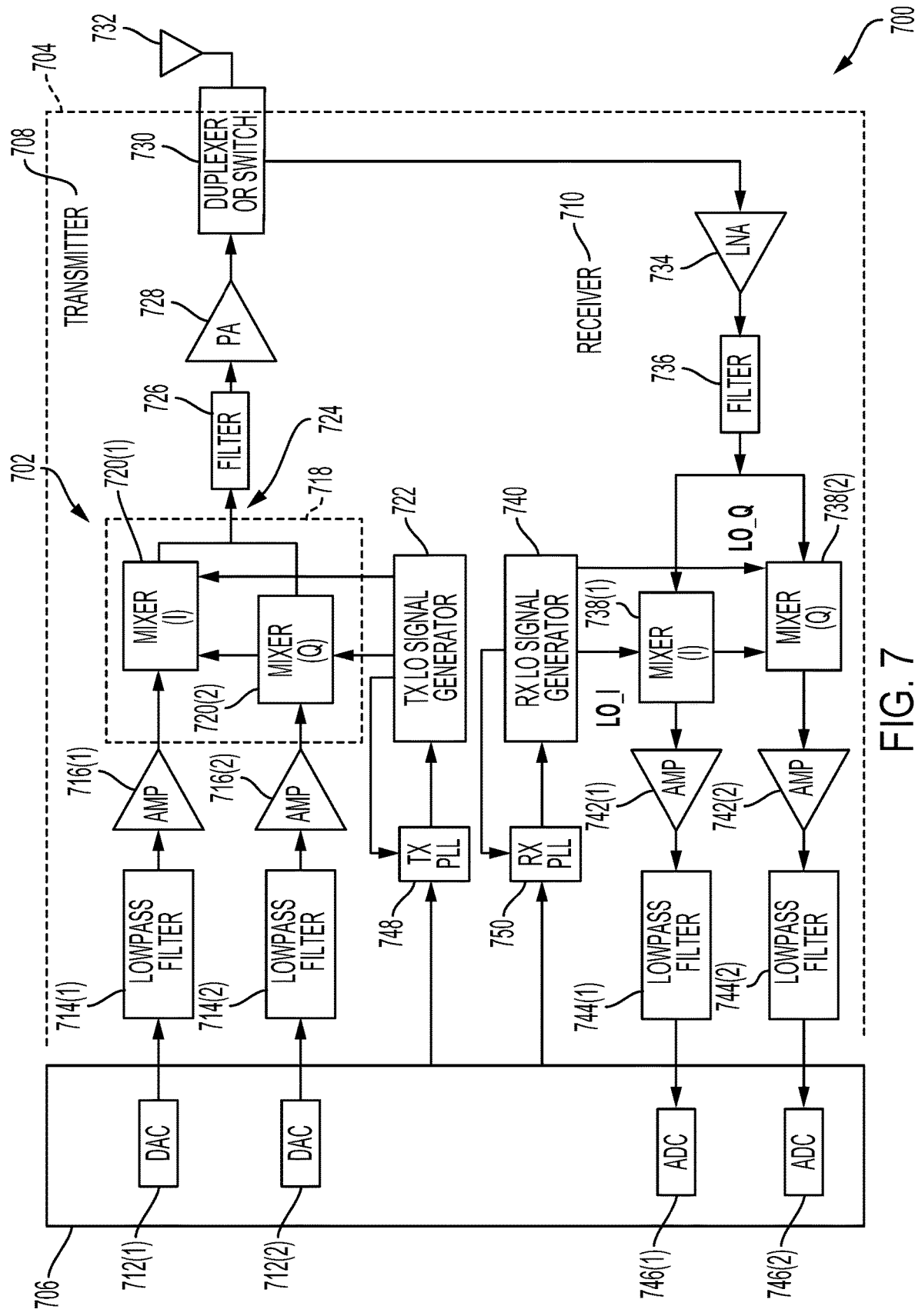
FIG. 7 is a block diagram of an exemplary wireless communications device that includes a radio frequency (RF) module including a system on a chip (SoC) in an IC in which an LPI subsystem circuit is configured to access a shared memory circuit by a subsystem memory interface of a memory subsystem in a first power mode and access the shared memory circuit by an LPI memory interface in a low-power mode, as shown in FIG. 3.

FIG. 7 illustrates an exemplary wireless communications device 700 that includes radio frequency (RF) components formed from one or more ICs 702, wherein any of the ICs 702 can include an SoC in an IC in which an LPI subsystem circuit is configured to access a shared memory circuit by a subsystem memory interface of a memory subsystem in a first power mode and access the shared memory circuit by an LPI memory interface in a low-power mode, as illustrated in FIG. 3, and according to any of the aspects disclosed herein. The wireless communications device 700 may include or be provided in any of the above-referenced devices, as examples. As shown in FIG. 7, the wireless communications device 700 includes a transceiver 704 and a data processor 706. The data processor 706 may include a memory to store data and program codes. The transceiver 704 includes a transmitter 708 and a receiver 710 that support bi-directional communications. In general, the wireless communications device 700 may include any number of transmitters 708 and/or receivers 710 for any number of communication systems and frequency bands. All or a portion of the transceiver 704 may be implemented on one or more analog ICs, RFICs, mixed-signal ICs, etc.

The transmitter 708 or the receiver 710 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage. In the direct-conversion architecture, a signal is frequency-converted between RF and baseband in one stage. The super-heterodyne and direct-conversion architectures may use different circuit blocks and/or have different requirements. In the wireless communications device 700 in FIG. 7, the transmitter 708 and the receiver 710 are implemented with the direct-conversion architecture.

In the transmit path, the data processor 706 processes data to be transmitted and provides I and Q analog output signals to the transmitter 708. In the exemplary wireless communications device 700, the data processor 706 includes digital-to-analog converters (DACs) 712(1), 712(2) for converting digital signals generated by the data processor 706 into the I and Q analog output signals, e.g., I and Q output currents, for further processing.

Within the transmitter 708, lowpass filters 714(1), 714(2) filter the I and Q analog output signals, respectively, to remove undesired signals caused by the prior digital-to-analog conversion. Amplifiers (AMPs) 716(1), 716(2) amplify the signals from the lowpass filters 714(1), 714(2), respectively, and provide I and Q baseband signals. An upconverter 718 upconverts the I and Q baseband signals with I and Q transmit (TX) local oscillator (LO) signals from a TX LO signal generator 722 through mixers 720(1), 720(2) to provide an upconverted signal 724. A filter 726 filters the upconverted signal 724 to remove undesired signals caused by the frequency upconversion as well as noise in a receive frequency band. A power amplifier (PA) 728 amplifies the upconverted signal 724 from the filter 726 to obtain the desired output power level and provides a transmit RF signal. The transmit RF signal is routed through a duplexer or switch 730 and transmitted via an antenna 732.

In the receive path, the antenna 732 receives signals transmitted by base stations and provides a received RF signal, which is routed through the duplexer or switch 730 and provided to a low noise amplifier (LNA) 734. The duplexer or switch 730 is designed to operate with a specific receive (RX)-to-TX duplexer frequency separation, such that RX signals are isolated from TX signals. The received RF signal is amplified by the LNA 734 and filtered by a filter 736 to obtain a desired RF input signal. Downconversion mixers 738(1), 738(2) mix the output of the filter 736 with I and Q RX LO signals (i.e., LO_I and LO_Q) from an RX LO signal generator 740 to generate I and Q baseband signals. The I and Q baseband signals are amplified by AMPs 742(1), 742(2) and further filtered by lowpass filters 744(1), 744(2) to obtain I and Q analog input signals, which are provided to the data processor 706. In this example, the data processor 706 includes analog-to-digital converters (ADCs) 746(1), 746(2) for converting the analog input signals into digital signals to be further processed by the data processor 706.

In the wireless communications device 700 of FIG. 7, the TX LO signal generator 722 generates the I and Q TX LO signals used for frequency upconversion, while the RX LO signal generator 740 generates the I and Q RX LO signals used for frequency downconversion. Each LO signal is a periodic signal with a particular fundamental frequency. A TX phase-locked loop (PLL) circuit 748 receives timing information from the data processor 706 and generates a control signal used to adjust the frequency and/or phase of the TX LO signals from the TX LO signal generator 722. Similarly, an RX PLL circuit 750 receives timing information from the data processor 706 and generates a control signal used to adjust the frequency and/or phase of the RX LO signals from the RX LO signal generator 740.

Wireless communications devices 700 that each include a system on chip (SoC) in an IC in which an LPI subsystem circuit is configured to access a shared memory circuit by a subsystem memory interface of a memory subsystem in a first power mode and access the shared memory circuit by an LPI memory interface in a low-power mode, as illustrated in FIG. 3, and according to any of the aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
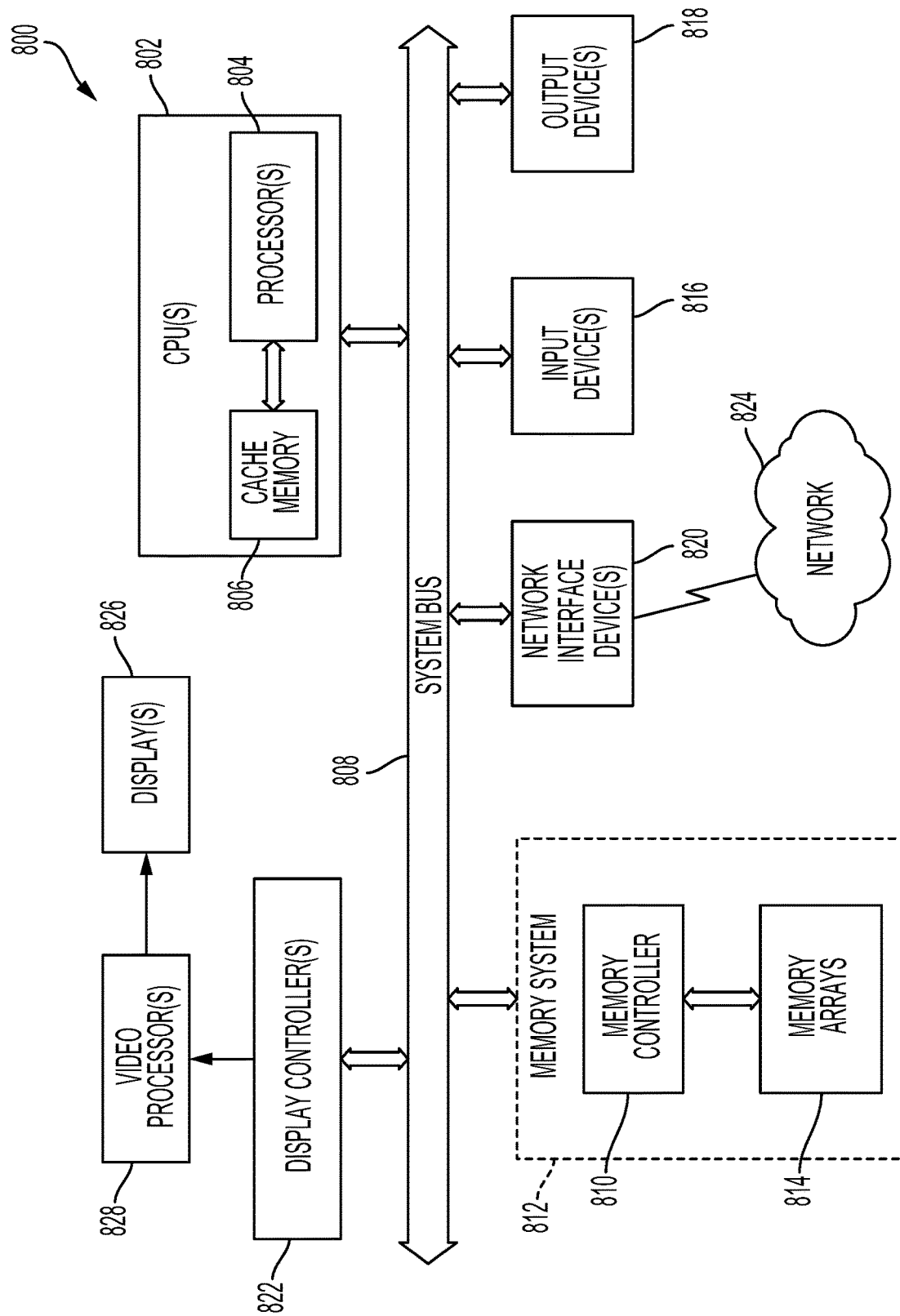
FIG. 8 is a block diagram of an exemplary IC package including exemplary IC dies including an SoC in an IC in which an LPI subsystem circuit is configured to access a shared memory circuit by a subsystem memory interface of a memory subsystem in a first power mode and access the shared memory circuit by an LPI memory interface in a low-power mode as illustrated in FIG. 3, and according to any of the aspects disclosed herein.

In this regard, FIG. 8 illustrates an example of a processor-based system 800 including ICs including an SoC in an IC in which an LPI subsystem circuit is configured to access a shared memory circuit by a subsystem memory interface of a memory subsystem in a first power mode and access the shared memory circuit by an LPI memory interface in a low-power mode, as illustrated in FIG. 3, and according to any aspects disclosed herein. In this example, the processor-based system 800 includes one or more CPUs 802, which may also be referred to as CPU or processor cores, each including one or more processors 804. The CPU(s) 802 may have cache memory 806 coupled to the processor(s) 804 for rapid access to temporarily stored data. As an example, the processor(s) 804 could include a system on chip (SoC) in an IC in which an LPI subsystem circuit is configured to access a shared memory circuit by a subsystem memory interface of a memory subsystem in a first power mode and access the shared memory circuit by an LPI memory interface in a low-power mode, as illustrated in FIG. 3, and according to any aspects disclosed herein. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. Although not illustrated in FIG. 8, multiple system buses 808 could be provided, wherein each system bus 808 constitutes a different fabric.

Other master and slave devices can be connected to the system bus 808. As illustrated in FIG. 8, these devices can include a memory system 812 that includes the memory controller 810 and one or more memory arrays 814, one or more input devices 816, one or more output devices 818, one or more network interface devices 820, and one or more display controllers 822, as examples. Each of the memory system 812, the one or more input devices 816, the one or more output devices 818, the one or more network interface devices 820, and the one or more display controllers 822 can include a system on chip (SoC) in an IC in which an LPI subsystem circuit is configured to access a shared memory circuit by a subsystem memory interface of a memory subsystem in a first power mode and access the shared memory circuit by an LPI memory interface in a low-power mode, as illustrated in FIG. 3, and according to any of the aspects disclosed herein. The input device(s) 816 can include any type of input device, including, but not limited to, input keys, switches, voice processors, etc. The output device(s) 818 can include any type of output device, including, but not limited to, audio, video, other visual indicators, etc. The network interface device(s) 820 can be any device configured to allow exchange of data to and from a network 824. The network 824 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 820 can be configured to support any type of communications protocol desired.

The CPU(s) 802 may also be configured to access the display controller(s) 822 over the system bus 808 to control information sent to one or more displays 826. The display controller(s) 822 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, a light emitting diode (LED) display, etc. The display controller(s) 822, display(s) 826, and/or the video processor(s) 828 can include a system on chip (SoC) in an IC in which an LPI subsystem circuit is configured to access a shared memory circuit by a subsystem memory interface of a memory subsystem in a first power mode and access the shared memory circuit by an LPI memory interface in a low-power mode, as illustrated in FIG. 3, and according to any of the aspects disclosed herein.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. An integrated circuit (IC) configured to operate in one of a first power mode and a second power mode, the IC comprising:
    a low-power island (LPI) subsystem circuit; and
    a memory subsystem comprising:
        a shared memory circuit;
        a subsystem memory interface configured to, in response to the IC operating in the first power mode.
            receive a first subsystem memory access request from the LPI subsystem circuit; and
            access the shared memory circuit in response to the first subsystem memory access request; and
        an LPI memory interface configured to, in response to the IC operating in the second power mode:
            receive an LPI memory access request from the LPI subsystem circuit; and access the shared memory circuit in response to the LPI memory access request.

2. The IC of clause 1, further comprising a plurality of primary subsystem circuits, wherein:
the subsystem memory interface is further configured to, in response to the IC operating in the first power mode:
receive a second subsystem memory access request from one of the plurality of primary subsystem circuits; and
access the shared memory circuit in response to the second subsystem memory access request.

3. The IC of clause 1 or clause 2, wherein:
the LPI subsystem circuit is configured to couple to a first supply voltage source in response to the IC operating in the first power mode and couple to a second supply voltage source in response to the IC operating in the second power mode;
the shared memory circuit is configured to:
couple to the first supply voltage source in response to the IC operating in the first power mode; and
couple to the second supply voltage source in response to the IC operating in the second power mode; and
the subsystem memory interface and the plurality of primary subsystems are each further configured to:
couple to the first supply voltage source in response to the IC operating in the first power mode; and
decouple from the first supply voltage source in response to the IC operating in the second power mode; and
the LPI memory interface is further configured to:
couple to the second supply voltage source in response to the IC operating in the second power mode; and
decouple from the second supply voltage source in response to the IC operating in the first power mode.

4. The IC of clause 2 or clause 3, wherein:
the IC is further configured to couple to an external memory;
in response to the IC operating in the first power mode, the subsystem memory interface is further configured to:
directly map a memory address in the first subsystem memory access request to a first cache line address in the shared memory circuit;
dynamically map a memory address in the second subsystem memory access request to a second cache line address in the shared memory circuit; and
access the shared memory circuit on a first memory interface; and
in response to the IC operating in the second power mode, the LPI memory interface is further configured to:
directly map a memory address in the LPI memory access request to a third cache line in the shared memory circuit; and
access the shared memory circuit on a second memory interface.

5. The IC of clause 4, wherein the subsystem memory interface comprises a tag random-access memory (RAM), the subsystem memory interface further configured to, in response to the IC operating in the first power mode:
access the tag RAM to dynamically map the memory address in the second subsystem memory access request to the second cache line address; and
provide one of the first cache line address and the second cache line address on the first memory interface.

6. The IC of clause 4 or clause 5, wherein, in response to the IC operating in the second power mode, the LPI memory interface is further configured to provide the third cache line address on the second memory interface.

7. The IC of any of clause 4 to clause 6, the memory subsystem further comprising a switch configured to:
in response to the IC operating in the first power mode:
couple to the first supply voltage source; and
couple the subsystem memory interface to the first memory interface of the shared memory circuit; and
in response to the IC operating in the second power mode:
couple to the second supply voltage source; and
couple the LPI memory interface to the second memory interface of the shared memory circuit.

8. The IC of any of clause 4 to clause 7, wherein the LPI subsystem circuit comprises an LPI processor configured to:
generate the first subsystem memory access request to access data stored in the external memory in response to the IC operating in the first power mode; and
generate the LPI memory access request to access data stored in the shared memory circuit in response to the IC operating in the second power mode.

9. The IC of any of clause 4 to clause 8, wherein the LPI subsystem circuit is further configured to:
generate, in response to the IC operating in the first power mode, the first subsystem memory access request on a first LPI interface coupled to the subsystem memory interface; and
generate, in response to the IC operating in the second power mode, the LPI memory access request on a second LPI interface coupled to the LPI memory interface.

10. The IC of any of clause 4 to clause 9, wherein the LPI subsystem circuit further comprises:
a tightly-coupled memory (TCM) configured to store a first data; and
an LPI cache circuit, wherein:
the shared memory circuit is configured to store a second data; and
in response to the IC operating in the second power mode, the LPI cache circuit is configured to store at least one of a version of the first data and a version of the second data.

11. The IC of any of clause 2 to clause 10, wherein:
a plurality of subsystem circuits comprises at least one of a central processing unit (CPU), a graphics processing unit (GPU), a peripheral interface, and a modem;
at least one of the plurality of subsystem circuits comprises an internal cache memory configured to store a first version of a subsystem data stored in an external memory; and
in response to the IC operating in the first power mode, the shared memory circuit is configured to store a second version of the subsystem data stored in the external memory.

12. A method of operating an integrated circuit (IC) in one of a first power mode and a second power mode, the method comprising:
in response to the IC operating in the first power mode:
receiving, in a subsystem memory interface in a memory subsystem, a first subsystem memory access request from a low-power island (LPI) subsystem circuit; and
accessing, by the subsystem memory interface, a shared memory circuit in response to the first subsystem memory access request; and
in response to the IC operating in the second power mode:
receiving, in an LPI memory interface in the memory subsystem, an LPI memory access request from the LPI memory interface; and accessing, by the LPI memory interface, the shared memory circuit in response to the LPI memory access request.

13. The method of clause 12, further comprising:
receiving, in the subsystem memory interface in the memory subsystem, a second subsystem memory access request from one of a plurality of primary subsystem circuits; and
accessing, by the subsystem memory interface, the shared memory circuit in response to the second subsystem memory access request.

14. The method of clause 13, further comprising:
in response to the IC operating in the first power mode:
coupling the LPI subsystem circuit, the shared memory circuit, the subsystem memory interface, and the plurality of primary subsystem circuits to a first supply voltage source; and
decoupling the LPI memory interface from a second supply voltage source; and
in response to the IC operating in the second power mode.
coupling the LPI subsystem circuit, the shared memory circuit, and the LPI memory interface to the second supply voltage source; and
decoupling the subsystem memory interface and the plurality of primary subsystem circuits from the first supply voltage source.

15. The method of clause 13 or clause 14, further comprising:
dynamically mapping a memory address in the second subsystem memory access request to a first cache line address in the shared memory circuit;
accessing, by the subsystem memory interface, the first cache line in the shared memory circuit on a first memory interface;
directly mapping a memory address in the first subsystem memory request to a second cache line address in the shared memory circuit; and
accessing, by the LPI memory interface, the second cache line address on a second memory interface.

16. The method of clause 15, further comprising, in response to the IC operating in the first power mode:
receiving, in the subsystem memory interface in the memory subsystem, a third subsystem memory access request from the LPI subsystem circuit; and
accessing, by the subsystem memory interface, a cache line in the shared memory circuit on the first memory interface, the cache line comprising a cache line address directly mapped to the memory address in the third subsystem memory access request.

17. The method of clause 16, the dynamic mapping further comprising:
determining, by accessing a tag random-access memory (RAM), a cache line address of the first cache line in the shared memory circuit corresponding to the memory address; and
providing the cache line address of the first cache line on the first memory interface.

18. The method of clause 15 to clause 17, further comprising, in response to the IC operating in the second power mode, providing by the LPI memory interface, a cache line address of the second cache line to the second memory interface.

19. The method of any of clause 15 to clause 18, further comprising:
in response to the IC operating in the first power mode, coupling, by a switch, the first memory interface to the shared memory circuit; and in response to the IC operating in the second power mode, coupling, by the switch, the second memory interface to the shared memory circuit.

20. The method of any of clause 12 to clause 19, further comprising:
generating, by an LPI processor in the LPI subsystem circuit, the first subsystem memory access request in response to the IC operating in the first power mode; and
generating, by the LPI processor in the LPI subsystem circuit, the LPI memory access request in response to the IC operating in the second power mode.

21. The method of any of clause 12 to clause 20, further comprises:
generating, in response to the IC operating in the first power mode, the first subsystem memory access request on a first LPI memory interface coupled to the subsystem memory interface; and
generating, in response to the IC operating in the second power mode, the LPI memory access request on a second LPI memory interface coupled to the LPI memory interface.

22. The method of any of clause 12 to clause 21, further comprising, in response to the IC operating in the second power mode.
storing a first LPI data for the LPI subsystem circuit in a tightly-coupled memory (TCM);
storing a second LPI data in the shared memory circuit; and
storing, in an LPI cache circuit, at least one of a version of the first LPI data and a version of the second LPI data.

23. The method of any of clause 13 to clause 22, wherein:
storing, in a cache memory of one of the plurality of primary subsystem circuits, a first version of a subsystem data stored in an external memory; and
in response to the IC operating in the first power mode, storing a second version of the subsystem data in the shared memory circuit.

What is claimed is:
1. An integrated circuit (IC) configured to operate in two power modes, the IC comprising:
a low-power island (LPI) subsystem circuit; and
a memory subsystem comprising:
a shared memory circuit;
a subsystem memory interface configured to, in response to the IC operating in the first power mode:
receive a first subsystem memory access request from the LPI subsystem circuit; and
access the shared memory circuit in response to the first subsystem memory access request; and
an LPI memory interface configured to, in response to the IC operating in the second power mode:
receive an LPI memory access request from the LPI subsystem circuit; and
access the shared memory circuit in response to the LPI memory access request.

2. The IC of claim 1, further comprising a plurality of primary subsystem circuits, wherein:
the subsystem memory interface is further configured to, in response to the IC operating in the first power mode:
receive a second subsystem memory access request from one of the plurality of primary subsystem circuits; and
access the shared memory circuit in response to the second subsystem memory access request.

3. The IC of claim 2, wherein:

the LPI subsystem circuit is configured to couple to a first supply voltage source in response to the IC operating in the first power mode and couple to a second supply voltage source in response to the IC operating in the second power mode;

the shared memory circuit is configured to:
couple to the first supply voltage source in response to the IC operating in the first power mode; and
couple to the second supply voltage source in response to the IC operating in the second power mode; and the subsystem memory interface and the plurality of primary subsystems are each further configured to:
couple to the first supply voltage source in response to the IC operating in the first power mode; and
decouple from the first supply voltage source in response to the IC operating in the second power mode; and the LPI memory interface is further configured to:
couple to the second supply voltage source in response to the IC operating in the second power mode; and
decouple from the second supply voltage source in response to the IC operating in the first power mode.

4. The IC of claim 2, wherein:
the IC is further configured to couple to an external memory;
in response to the IC operating in the first power mode, the subsystem memory interface is further configured to:
directly map a memory address in the first subsystem memory access request to a first cache line address in the shared memory circuit;
dynamically map a memory address in the second subsystem memory access request to a second cache line address in the shared memory circuit; and
access the shared memory circuit on a first memory interface; and
in response to the IC operating in the second power mode, the LPI memory interface is further configured to:
directly map a memory address in the LPI memory access request to a third cache line in the shared memory circuit; and
access the shared memory circuit on a second memory interface.

5. The IC of claim 4, wherein the subsystem memory interface comprises a tag random-access memory (RAM), the subsystem memory interface further configured to, in response to the IC operating in the first power mode:
access the tag RAM to dynamically map the memory address in the second subsystem memory access request to the second cache line address; and
provide one of the first cache line address and the second cache line address on the first memory interface.

6. The IC of claim 5, wherein, in response to the IC operating in the second power mode, the LPI memory interface is further configured to provide the third cache line address on the second memory interface.

7. The IC of claim 6 the memory subsystem further comprising a switch configured to:
in response to the IC operating in the first power mode:
couple to the first supply voltage source; and
couple the subsystem memory interface to the first memory interface of the shared memory circuit; and
in response to the IC operating in the second power mode:
couple to the second supply voltage source; and
couple the LPI memory interface to the second memory interface of the shared memory circuit.

8. The IC of claim 4, wherein the LPI subsystem circuit comprises an LPI processor configured to:

generate the first subsystem memory access request to access data stored in the external memory in response to the IC operating in the first power mode; and
generate the LPI memory access request to access data stored in the shared memory circuit in response to the IC operating in the second power mode.

9. The IC of claim 8, wherein the LPI subsystem circuit is further configured to:
generate, in response to the IC operating in the first power mode, the first subsystem memory access request on a first LPI interface coupled to the subsystem memory interface; and
generate, in response to the IC operating in the second power mode, the LPI memory access request on a second LPI interface coupled to the LPI memory interface.

10. The IC of claim 9, wherein the LPI subsystem circuit further comprises:
a tightly-coupled memory (TCM) configured to store a first data; and
an LPI cache circuit, wherein:
the shared memory circuit is configured to store a second data; and
in response to the IC operating in the second power mode, the LPI cache circuit is configured to store at least one of a version of the first data and a version of the second data.

11. The IC of claim 1, wherein:
a plurality of subsystem circuits comprises at least one of a central processing unit (CPU), a graphics processing unit (GPU), a peripheral interface, and a modem;
at least one of the plurality of subsystem circuits comprises an internal cache memory configured to store a first version of a subsystem data stored in an external memory; and
in response to the IC operating in the first power mode, the shared memory circuit is configured to store a second version of the subsystem data stored in the external memory.

12. A method of operating an integrated circuit (IC) in two power modes, the method comprising:
in response to the IC operating in the first power mode:
receiving, in a subsystem memory interface in a memory subsystem, a first subsystem memory access request from a low-power island (LPI) subsystem circuit; and
accessing, by the subsystem memory interface, a shared memory circuit in response to the first subsystem memory access request; and
in response to the IC operating in the second power mode:
receiving, in an LPI memory interface in the memory subsystem, an LPI memory access request from the LPI memory interface; and
accessing, by the LPI memory interface, the shared memory circuit in response to the LPI memory access request.

13. The method of claim 12, further comprising:
receiving, in the subsystem memory interface in the memory subsystem, a second subsystem memory access request from one of a plurality of primary subsystem circuits; and
accessing, by the subsystem memory interface, the shared memory circuit in response to the second subsystem memory access request.

14. The method of claim 13, further comprising:
in response to the IC operating in the first power mode:

coupling the LPI subsystem circuit, the shared memory circuit, the subsystem memory interface, and the plurality of primary subsystem circuits to a first supply voltage source; and decoupling the LPI memory interface from a second supply voltage source; and in response to the IC operating in the second power mode:

coupling the LPI subsystem circuit, the shared memory circuit, and the LPI memory interface to the second supply voltage source; and decoupling the subsystem memory interface and the plurality of primary subsystem circuits from the first supply voltage source.

15. The method of claim 13, further comprising:

dynamically mapping a memory address in the second subsystem memory access request to a first cache line address in the shared memory circuit;

accessing, by the subsystem memory interface, the first cache line in the shared memory circuit on a first memory interface;

directly mapping a memory address in the first subsystem memory request to a second cache line address in the shared memory circuit; and accessing, by the LPI memory interface, the second cache line address on a second memory interface.

16. The method of claim 15, further comprising, in response to the IC operating in the first power mode:

receiving, in the subsystem memory interface in the memory subsystem, a third subsystem memory access request from the LPI subsystem circuit; and accessing, by the subsystem memory interface, a cache line in the shared memory circuit on the first memory interface, the cache line comprising a cache line address directly mapped to the memory address in the third subsystem memory access request.

17. The method of claim 16, the dynamic mapping further comprising:

determining, by accessing a tag random-access memory (RAM), a cache line address of the first cache line in the shared memory circuit corresponding to the memory address; and providing the cache line address of the first cache line on the first memory interface.

18. The method of claim 17, further comprising, in response to the IC operating in the second power mode, providing by the LPI memory interface, a cache line address of the second cache line to the second memory interface.

19. The method of claim 18, further comprising:

in response to the IC operating in the first power mode, coupling, by a switch, the first memory interface to the shared memory circuit; and in response to the IC operating in the second power mode, coupling, by the switch, the second memory interface to the shared memory circuit.

20. The method of claim 12, further comprising:

generating, by an LPI processor in the LPI subsystem circuit, the first subsystem memory access request in response to the IC operating in the first power mode; and generating, by the LPI processor in the LPI subsystem circuit, the LPI memory access request in response to the IC operating in the second power mode.

21. The method of claim 20, further comprises:

generating, in response to the IC operating in the first power mode, the first subsystem memory access request on a first LPI memory interface coupled to the subsystem memory interface; and generating, in response to the IC operating in the second power mode, the LPI memory access request on a second LPI memory interface coupled to the LPI memory interface.

22. The method of claim 21, further comprising, in response to the IC operating in the second power mode:

storing a first LPI data for the LPI subsystem circuit in a tightly-coupled memory (TCM);

storing a second LPI data in the shared memory circuit; and storing, in an LPI cache circuit, at least one of a version of the first LPI data and a version of the second LPI data.

23. The method of claim 22, wherein:

storing, in a cache memory of one of the plurality of primary subsystem circuits, a first version of a subsystem data stored in an external memory; and in response to the IC operating in the first power mode, storing a second version of the subsystem data in the shared memory circuit.

* * * * *